Dec. 15, 1931.  L. N. LEET  1,836,077
ELECTROMAGNET VALVE DEVICE
Filed March 28, 1929
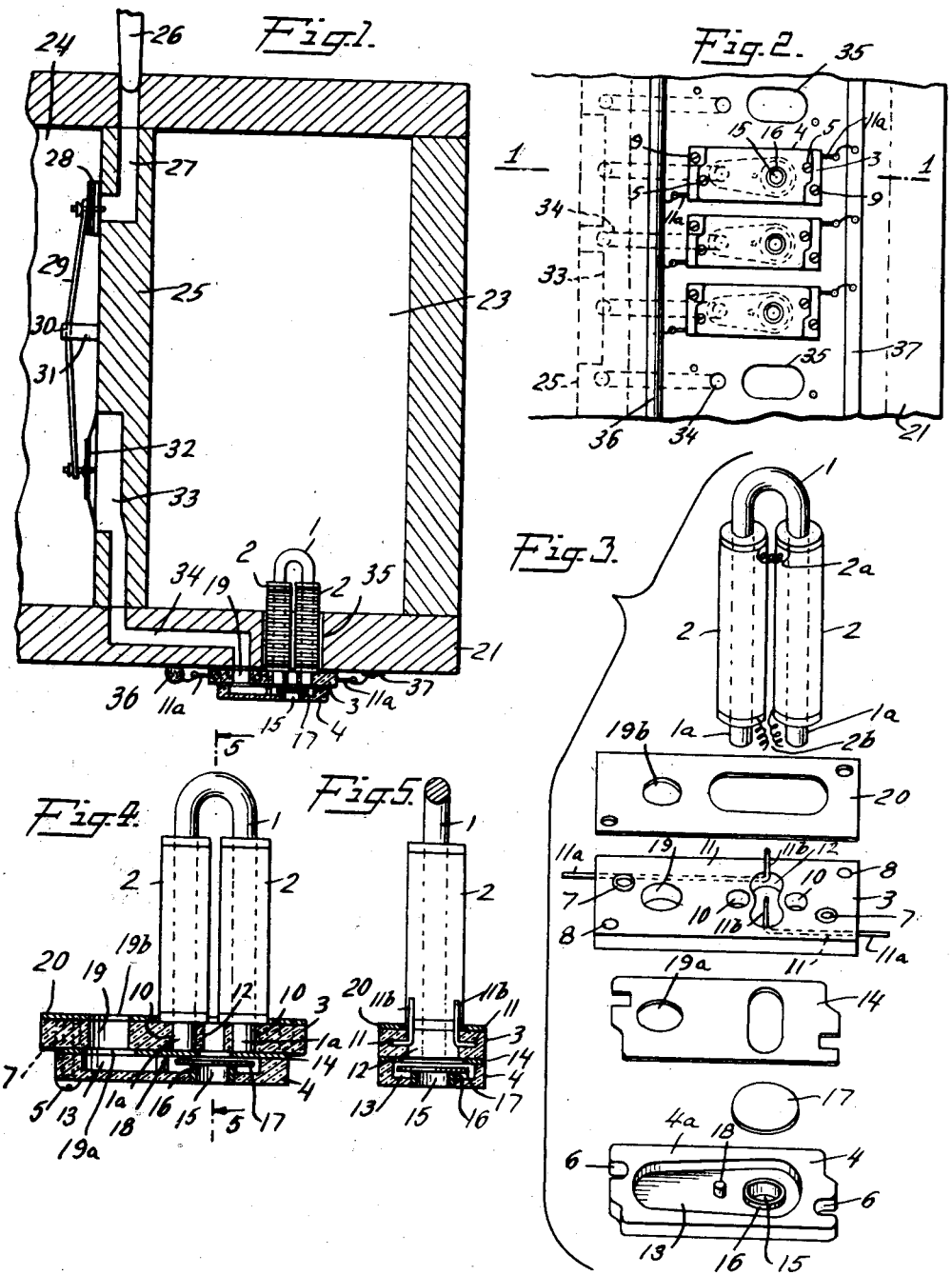
INVENTOR
Leslie N. Leet
BY
ATTORNEY Patented Dec. 15, 1931

1,836,077

UNITED STATES PATENT OFFICE

LESLIE N. LEET, OF MOUNTAINSIDE, NEW JERSEY, ASSIGNOR TO THE AEOLIAN COMPANY, A CORPORATION OF CONNECTICUT

ELECTROMAGNET VALVE DEVICE

Application filed March 28, 1929. Serial No. 350,570.

My present invention relates to an improved electro-magnet valve device adapted for use in connection with organ actions and elsewhere, and has the advantage that each device is a self-contained unit attachable and removable individually from the wind chest or other object of attachment, with the base of said device located on the outside of the chest and with the wires of the electro-magnet projecting from said base and exposed for ready attachment to and detachment from the cable and common-return electric wiring on the outside of said chest. These and other features and advantages of my invention will appear from an understanding of the following specification in connection with the drawings showing a preferred form of my invention.

In said drawings, Fig. 1 is a vertical cross-sectional view, partly in elevation, through a pipe organ wind chest to which my electro-magnet valve device is shown applied, this Fig. 1 being otherwise describable as being a vertical cross-section on the line 1—1 in Fig. 2; Fig. 2 is a fragmentary plan view underneath plan view of said wind chest showing a series of three of my said electro-magnet valve devices applied thereto, the places and pneumatic connections for receiving two more of said devices being also shown; Fig. 3 is a perspective view of my device with the parts thereof separated from one another and arranged in the order of their assembly; Fig. 4 is a side elevation of the assembled device detached from the wind chest, the base of said device being shown in cross-section; and Fig. 5 is a cross-sectional view on the line 5—5 in Fig. 4 looking in the direction of the arrows.

My electro-magnet valve device in its preferred form is shown dissected in Fig. 3 and assembled in the other figures, and comprises an electro-magnet having preferably a U-shaped iron core 1 with cylindrical poles 1ª and coils 2, the latter connected in series at 2ª with the terminals 2ᵇ at the poles 1ª.

The device has a base consisting of two tablets 3 and 4 adapted to be secured together in face contact (except for the gasket 14 located between them) by screws 5 located in the notches 6 in tablet 4 and screwing into threaded, preferably metal bushed holes 7 in tablet 3. The larger area of tablet 3 provides for the holes 8 through it to receive screws 9 for attaching the entire base and attached magnet in place on the wind chest, as will be hereinafter seen.

10—10 are a pair of holes through the tablet 3 into which the poles 1ª of the electro-magnet can project and are there secured preferably air-tight. This tablet 3 is preferably molded of an insulating material such as a phenolic condensation product, and contains two wires 11 molded therein. The ends 11ª of these wires project from the ends of the tablet and their other ends 11ᵇ project into a hole or port 12 in the tablet between the poles of the magnet, and are thence bent upwardly or towards the electro-magnet and therefore into a convenient position to be soldered to the respective terminals 2ª of said magnet. When this has been done, the projecting extremities 11ª of the wires constitute the electrical terminals of the magnet.

The lower tablet 4 may also be molded of a phenolic condensation product and has a longitudinally extending recess or cavity 13 therein facing the tablet 3 so as to be covered thereby when the tablets are assembled together.

14 is a thin gasket of leather or other suitable material located between the tablets 3 and 4 for making an air-tight connection all around between the rim 4ª of the tablet 4 and the underside of the tablet 3. A port 15 extends through the bottom of the tablet 4 in line with the port 12 in the other tablet 3, said port 15 being preferably bushed by a brass bushing 16, one end of which projects into the cavity 13 and therein forms a rim raised above the bottom of said cavity.

17 is a sheet iron disk which when the electro-magnet is de-energized rests upon the rim of the bushing 16 above the bottom of the cavity and serves to seal the port through said bushing. On the other hand, when the electro-magnet is energized, it magnetically attracts the valve disk 17 against the port 12 of the tablet 3 and seals it, and vice versa opens the port 15. This valve 17 is large enough preferably to close also the holes 10—10. 18 is a small projection integral with the bottom of the cavity 13 located adjacent the periphery of the valve disk to prevent displacement of said valve from its operative position between the aforesaid ports 12 and 15. 19 is a port through the tablet 3 in constant communication with the hollow space formed by the cavity 13 in the base of the device.

20 is a gasket of leather or equivalent material covering the top of the tablet 3 so as to be located between it and the wall of the wind chest or other chamber to make an air-tight joint.

Figs. 1 and 2 show one of the illustrative uses of the device, namely, its use in connection with a pipe organ action. Of the latter it is only necessary to show a fragment for this purpose. 21 designates said wind chest containing two compressed air chambers 23 and 24 separated by partition 25. 26 is the lower end of an organ pipe seated in the mouth of an air passage 27, the latter leading out through the side of the partition to a port connecting with the chamber 24. 28 is a valve for said port on the end of a lever 29 centrally pivoted at 30 to a support 31 secured to the partition. The other end of this lever is pivoted to a disk 32 secured to the flexible covering of a pouch chamber 33 formed in the partition. A duct 34 connects said pouch with the port 19 in the tablet 3. The leather gasket 20, of course, has a hole 19$^b$ (Fig. 3) through it in alignment with said port 19 in tablet 3; and similarly the other gasket 14 is provided with a hole 19$^a$ (Fig. 3) to connect the port 19 with the cavity 13 (Fig. 3).

When the parts shown in Fig. 3 of my electro-magnet valve device are assembled, it forms a unitary device as shown in Figs. 4 and 5 comprising an electro-magnet mounted on a base. There will be one of these devices for each organ pipe 26. Whereas only one organ pipe is shown in Fig. 1, this is supposed to be the front pipe of a row of pipes located behind it. There will be also a separate valve 28, lever 29, pouch 33, and duct 34 for each of said pipes. Fig. 2, which is a fragmentary underneath view of the wind chest, shows five of said ducts 34 and three of my electro-magnet valve devices fastened by their bases to the bottom of the wind chest by screws 9. At two places the device is omitted from Fig. 2 in order to show the mouths 34 of the ducts 34 (which as heretofore described connect with the ports 19 when the devices are in place); also to show the holes 35 through the bottom of the wind chest. Each electro-magnet extends up through one of these latter holes 35 as in Fig. 1, when the device is in place and at said time the rim of each hole bears air-tight against the gasket 20 when the base of the device has been secured to the wall of the wind chest.

The electric current is carried to the magnets by a cable 36 of insulated wires, one for each magnet, and by a bus-bar 37 or common-return wire for all of said magnets. Said cable 36 and common-return 37 are supported on the outside of the wind chest. The base of the magnets and the ends 11$^a$ of the wires 11 being also fully exposed on the outside of the wind chest, it will be seen that the electrical connections between them, shown in Figs. 1 and 2, can be readily soldered and unsoldered or otherwise connected or disconnected in any other convenient manner. Moreover, if anything goes wrong with any one magnet or valve device, it can be readily disconnected, removed, fixed and replaced without disturbing any of the others and without removing the bottom of the wind chest. Further, if the trouble is merely with the valve of any device, it is only necessary to remove the screws 5 to remove the lower tablet 4 to get at said valve without disturbing the attachment of the tablet 3 and the magnet to the wind chest and without disturbing the electrical connections between the terminals 11$^a$ of said magnet with the electric cable and common-return wires.

Further details not already mentioned are:—There is the elongated hole through the gasket 20 shown in Fig. 3 so as not to interfere with the port 12 or with the seating of the poles of the magnet in the holes 10 with the bottoms of the coils 2 against the tablet 3. There is the elongated hole through the gasket 14 shown in Fig. 3 corresponding to the port 12 in the tablet 3.

The operation is as follows of the described pneumatic elements:—When there is no current on the magnet in Fig. 1, the valve 17 seals the port 15 held down by the air pressure in the chamber 23 acting through the port 12. When the magnet is energized, it attracts the valve 17, sealing the port 12 and opening the port 15, which latter thereupon vents the duct 34 and pouch 33 to the atmosphere, whereupon the air pressure in the chamber 24 collapses said pouch, tilts the lever 29 and raises the valve 28 to admit the wind from said chamber 24 to the duct 27 to cause the pipe 26 to speak. For simplicity, the primary valve usually employed in connection with the duct 34 between the port 19 and the pouch 33 has been omitted.

What I claim is:

An electro-magnet valve device comprising in combination an electro-magnet and a base, said base comprising superposed tablets containing an air space between them, a valve of magnetic material in said space operable by the magnet to control opposite ports through the respective tablets, the poles of said magnet projecting into holes adjacent opposite edges of the aforesaid port in one of the tablets, and wires molded between the faces of said last named tablet, said tablet being made of insulating material, the extremities of said wires projecting from said tablet, two of said extremities projecting from the tablet through the side of its port between the poles of the magnet for ready attachment to the coils thereof, and the other extremities of said wires projecting peripherally from opposite ends of the tablet for ready attachment to energize the magnet.

Signed at Garwood, in the county of Union and State of New Jersey, this 26th day of March A. D. 1929.

LESLIE N. LEET.